United States Patent [19]

Lemelson

[11] 4,304,823
[45] Dec. 8, 1981

[54] ELECTRICAL ENERGY STORAGE SYSTEM

[76] Inventor: Jerome H. Lemelson, 85 Rector St., Metuchen, N.J. 08840

[21] Appl. No.: 127,399

[22] Filed: Mar. 5, 1980

[51] Int. Cl.³ .............................................. H01M 8/18
[52] U.S. Cl. ........................................ 429/19; 429/17; 429/61; 429/81; 429/93
[58] Field of Search ...................... 429/17, 19, 61, 62, 429/72, 81, 93

[56] References Cited

U.S. PATENT DOCUMENTS

| | | | |
|---|---|---|---|
| 3,542,597 | 11/1970 | Smith et al. | 429/17 |
| 3,935,024 | 1/1976 | Symons | 429/17 X |
| 4,001,041 | 1/1977 | Menard | 429/17 |
| 4,002,805 | 1/1977 | Waldman | 429/17 |
| 4,200,682 | 4/1980 | Sederquist | 429/17 |
| 4,202,933 | 5/1980 | Reiser et al. | 429/17 X |

Primary Examiner—Charles F. LeFevour

[57] ABSTRACT

An electric storage battery and a method for monitoring the operation of the battery and automatically replenishing chemicals employed to operate the battery and provide its electrical energy output. In one form, a computer or microprocessor receives, processes and automatically analyzes signals received from a plurality of sensors which sense the battery condition and operation. The microprocessor generates control signals for controlling the flow of chemicals to and from the battery operating chamber or chambers. As a result, the battery is kept in a predetermined state of charge or operating condition.

12 Claims, 2 Drawing Figures

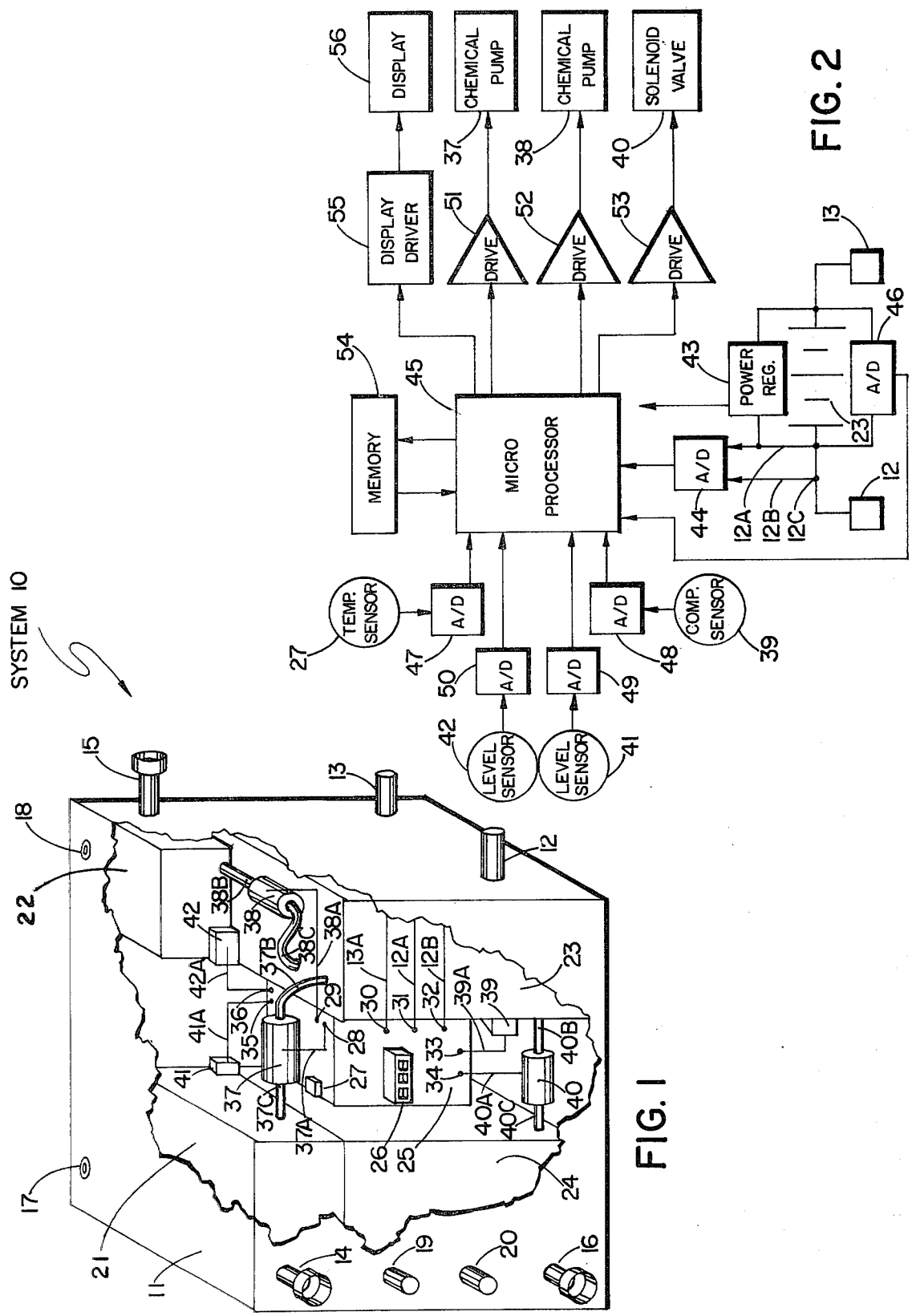

ELECTRICAL ENERGY STORAGE SYSTEM

SUMMARY OF THE INVENTION

This invention relates to a system and method for controlling the operating condition of a chemically activated or charged electric battery wherein battery conditions are sensed and electrical signals are generated which are processed and analyzed by a computer or microelectronic processor which generates signals for displaying or otherwise indicating battery operation and for controlling the flow of chemicals to and from the battery itself to maintain the battery in a suitable or predetermined operating condition.

It is known in the art to provide an electric battery capable of generating electric current for operating one or more electrical devices over an extended period of time. Such batteries are either of the single discharge type or may be recharged a number of times after they have become discharged, to permit them to generate electricity for an extended period of time.

Various chemical batteries have also been developed which generate electricity as a result of a chemical reaction between two or more elements or compounds which become chemically changed during the reaction and eventually are expended leaving the battery in a discharged or spent condition. Other forms of electrical energy generating devices or batteries include fuel cells, such as thermo-electric generators, which generate electrical energy when one or more fuels are burned in a reaction chamber and directly convert the heat of combustion to electrical energy.

The instant invention employs a chemical or fuel cell type of battery requiring one or more chemicals or fuels are provided when the flow of a chemical or chemicals to maintain the operation of the battery is automatically controlled in accordance with signals which are generated as the battery is used or discharged.

Accordingly, it is a primary object of this invention to provide a new and improved apparatus and method for generating electricity.

Another object is to provide a new and improved electric battery and a control system for controlling and monitoring the operation thereof.

Another object is to provide a new and improved chemical battery and a method for automatically replenishing its chemicals.

Another object is to provide a computer controlled electric battery which is always maintained at a given level of operation.

Another object is to provide an electric battery and a control system therefor which is fully contained within the battery.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is an isometric view of an energy storage system employing a chemically activated electrical energy generating battery, one or more storage reservoirs for chemicals to be used in the battery and electronically activated control means for controlling the flow of chemical to and from the electrical energy generating chamber or chambers of the battery.

FIG. 2 is a schematic diagram of the electrical components and the electrically operated motors and solenoids employed in the operation of the battery of FIG. 1.

FIG. 1 illustrates a typical construction of a chemically activated battery system 10 which comes within the purview of the invention. A housing 11 of suitable material supports a plurality of battery electrical connection terminals or posts 12 and 13 and defines a support and retainer for respective chemical recharge inlet ports 14 and 15. Such inlets are provided with suitable valving or valves to prevent the reverse flow of chemicals conducted therethrough. Also connected to housing 11 is as spent chemical drainage port 16, which may be valved or capped to prevent spillage and self-sealing pressure equalization ports 17 and 18, and catalysis heat inlet and outlet ports 19 and 20. Also contained within the housing 11 and protected thereby are a plurality of storage tanks 21 and 22 for storing fresh reaction chemicals, which tanks are of a suitable size and are constructed of suitable non-corrosive materials which, when reacted in the electro-chemical reaction cells 23 of the battery, result in the production of electrical energy which is output at the terminals 12 and 13. A catalytic regeneration or spent fuel storage tank 24 and a housing 25 containing an electronics control package for controlling operation of the system 10, are also supported by the battery housing. The electronics control package includes a display 26 such as a liquid crystal diode character display or other suitable electrically operated display. A temperature sensor 27 and connectors, denoted 28–36 for effecting electrical connections between a plurality of motors operating chemical pumps 37 and 38 through respective cables 12A, 12B, 13A, 37A, 38A, 39A, 40A, 41A and 42A. Such cables also connect the battery posts 12 and 13, a current tap point 12C, a reaction battery 23, a chemical or ionic content sensor 39, a solenoid valve 40, for valving spent chemicals and a plurality of chemical level sensors 41 and 42 for sensing the levels of chemicals in the battery cells. Also provided within housing 11 are a plurality of fluid conduction pipes 37B and 37C which connect pump 37 to a replenishment reservoir 21 and the same pump to a reaction cell 23 of the battery.

A pair of fluid conduction pipes 38B and 38C respectively connect replenishment reservoir 22 to the pump 38 and said pump to a reaction cell 23. Fluid conduction pipes 30B and 30C respectively conect solenoid valve 40 to reaction cell 23 and valve 40 to a spent fuel tank 24.

FIG. 2 illustrates typical electronic components which define the battery arrangement 10 including its control system. Initially, replenishment reservoirs 21 and 22 are charged with the appropriate chemical or chemicals, as is the reaction cell 23 of the battery. When current generated in the battery cell 23, is conducted to terminals or posts 12 and 13 for immediate application to an external load, such electrical energy is also conducted to a power regulator 43, the output of which is operable to provide appropriate operational voltages to the remaining electrical components of the system 10. When an external load is connected across the terminals 12 and 13, current is drawn through a short length of the battery 23 to the connection lead of post 12 which has a known resistance. This causes a small voltage drop across such lead, which drop is proportional to the current drawn. This voltage drop is sensed and converted to digital form by an analog-to-digital converter 44 and thus becomes one of the control and metering inputs to a microprocessor or microcomputer 45 supported within or on the battery housing. Other code signal inputs to the microprocessor 45 are provided such as a code indicative of actual battery voltage which is generated on the output of an analog-to-digital converter 46; signals indicative of ambient or cell temperature sensed by a temperature sensor 27, which may comprise a thermistor or other sensing device connected to an analog-to-digital converter 47; signals indicative of the chemical composition of reaction cell 23 generated by a chemical composition sensor 39, such as a pH probe or other sensor connected to an analog-to-digital converter 48; the level of fluid in reservoir 21 sensed by a fluid level sensor 41, such as a variable resistance flow indicating mechanism which is connected to an analog-to-digital converter 49, and the level of fluid in reservoir 22 sensed by a similar level sensor 42 connected to an analog-to-digital convertor 50.

By processing and analyzing signals from the above mentioned sensing devices, the microprocessor or computer 45 provides output control signals for properly controlling such variables as the rate of flow of chemicals required by the battery 23 to meet the current requirement of the external load for the ambient condition. When operating in this mode, the microprocessor 45 may thus be used to control or actuate chemical pumps 37 through a driver 51 and cause it to deliver a suitable amount of contents from the reservoir 21 to the battery or battery cell 23. Chemical pump 38 may also be controllably operated via a driver 52 to perform a similar function for the contents of reservoir 22. Solenoid valve 40 may also be similarly controlled through a driver 53, to flow spent chemicals to reservoir 24.

Additional features of the system 10 include the recording in a memory 54 of signals generated by the microprocessor 45 and certain, if not all of the described sensors, which signals are indicative of the condition of the battery and its fluid reservoirs 21 and 22. Such information may be displayed by means of a display device 56 driven by a driver 55 receiving signals from the microprocessor. Such display device may comprise an array or arrays of character indicating liquid crystal diodes in alphanumeric format, which require very little current for their selective operation.

The energy generating system illustrated is also operable to recharge or replenish spent chemicals by means of catalysis wherein heat is employed and applied to the input and output tubes or ducts 19 and 20, wherein such replenished or recharged chemicals are pumped back into the battery cell 23 by means of pump 37 from reservoir 21. Provision is also made for the complete discharge or dispensing of the spent chemicals and the replacement thereof with fresh chemicals by the inclusion of inlet ports 14 and 15 and an outlet port 16. Vents 17 and 18 are provided for equalizing pressure within the battery as fluids circulate materials are pumped about and gases are generated.

Notations 37 and 38 refer not only to suitable chemical pumps operable to function as described, but also to the electric motors driving such pumps and controls therefore which are energized to properly control the operation of the pump motors in accordance with the control signals generated by the electronic drives 51 and 52 which are energized by signals generated on respective outputs of the microprocessor 45 or amplified forms of such signals processed and amplified by suitable signal amplifying means.

Displays such as 26 of FIG. 1 and 56 of FIG. 2 are preferably supported by housing 11 or the container for the electronic package 25 adjacent a window provided in said housing 11 so that such displays may be easily viewed from the exterior of housing 11.

A plurality of displays may be provided, each for displaying different battery parameter information as described. Such displays may be replaced or supplemented by sound producing devices such as buzzers, horns or synthetic speech generators which are operable to generate synthetic speech signals and sounds of speech indicative of the conditions sensed either as they are sensed or in accordance with signals generated by closure of a manual switch or by a remote computer.

It is also noted that while the energy generating system 10 illustrated in FIGS. 1 and 2 may comprise any suitable electric battery in which one or more fluid chemicals are employed to generate electricity as they change in chemical composition or become spent with respect to their ability to effect the generation of electrical energy with respect to such chemicals and/or other components such as electrodes disposed in the energy generating cell, the control system illustrated in FIG. 2 or a modified form thereof may also be employed to control the operation of electrical energy generating fuel cells which burn or otherwise consume a fuel to generate electricity on an output or outputs thereof. Such parameters as cell temperature, cell electrical energy output, electrode or other component state, condition or quantity, fuel flow, burning rate, cell pressure and components condition may be sensed by suitable sensors or transducers to generate electrical signals which may be similarly digitized and processed in a microprocessor of the type described which is employed as described to control the operation of a display or displays, pumps or pump motors, valves or valve actuators for optimizing and effecting proper operation of the components of the fuel cell or generator. As in the battery system shown in FIG. 2, the level of fuel in a reservoir may also be sensed and indicated by display and/or other warning means such as a sound or synthetic speech generator or system of known design. Where a plurality of such batteries or fuel cells are provided for powering common devices, the operation of each and its switching connection to a power line may be similarly controlled by signals generated by a microprocessor or computer in accordance with signals received thereby from sensors as described and digitized by suitable analog-to-digital converters.

Where not illustrated in the drawings, it is assumed that the correct power supplies are provided on the correct sides of all switches, motors, solenoids, displays, drives and other components illustrated or described herein.

I claim:
1. A chemically-powered generating system comprising:
   a housing,
   first means supported within said housing for generating electricity by chemical action,
   second means accessible to the exterior of said housing for outputting electrical energy generated by said first means,
   third means including a supply of fluid chemical for use by said first means in generating electricity, fourth means for effecting flow of said chemical between said third means and said first means, fifth means for controlling said flow of fluid chemical to said first means, sensing means for sensing the operating condition of said first means and generating analog electrical signals which are indicative of the condition sensed, sixth means including electronic processing means and computing means for receiving signals generated by said sensing means, said electronic processing means being operable to receive and convert the analog electrical signals generated by said sensing means to digital signals, said computing means being operable to perform computational analysis of said digital signals and to generate output control signals when the signals generated by said sensing means attain a predetermined value, and means for applying said control signals to said fifth means to cause said fifth means to properly control the flow of said fluid chemical to said first means to maintain said first means in a predetermined operating condition for properly generating electricity on said second means.

2. A power generating system in accordance with claim 1 wherein the operation of said first means involves a chemical change in the fluid chemical disposed within said first means, further including seventh means controlled by the signals generated by said computing means for controllably removing chemically changed fluids from said first means.

3. A power generating system in accordance with claim 2 including means for controllably removing chemically changed material from said first means, said sensing means including means for sensing the condition of chemicals in said first means and means for generating electrical signals indicative of such chemical condition, and eighth means for controlling flow of fluid chemical material from said first means, means for receiving fluid flowed from said first means, means for using the control signals generated by said computing means to control the operation of said eighth means to cause said eighth means to controllably remove said chemical from said first means.

4. A power generating system in accordance with claim 3 wherein said eighth means is operable to control the operation of said fifth and seventh means to respectively control the flow of chemical to and from said first means.

5. A power generating system in accordance with claim 4 wherein said eighth means comprises said electronic computer.

6. A power generating system in accordance with claim 4 wherein said sixth and eighth means comprises an electronic microprocessor means.

7. A power generating system in accordance with claim 4, further including a reservoir for receiving liquid chemical discharged by said first means.

8. A power generating system in accordance with claim 7 wherein said reservoir is located within said housing.

9. A power generating system in accordance with claim 7 wherein said reservoir is formed integral with said housing.

10. A power generating system in accordance with claim 1 including display means viewable from the exterior of said housing for displaying information which is indicative of the condition of the liquid chemical disposed within said first means.

11. A power generating system in accordance with claim 1 including display means for displaying information which is indicative of the condition of the liquid chemical in said reservoir.

12. A chemically powered energy generating system comprising in combination with a unitary housing:

first, second and third interconnected reservoirs for fluid chemicals provided within said housing, said first reservoir having a supply of unused fluid chemicals, means in said second reservoir for generating electrical energy using chemicals from said first reservoir in a reaction in which the chemical fluid supplied to said second reservoir is spent in said second reservoir and requires removal therefrom, said third reservoir being operable to receive spent fluid chemicals from said second reservoir, first flow control means for controlling the flow of fluid from said first reservoir to said second reservoir, second flow control means for controlling the flow of fluid from said second reservoir to said third reservoir, means for sensing the condition of fluid in said second reservoir and generating a signal which is indicative of such condition, and electronic computing means comprising a microelectronic processor for receiving and processing said signal, analyzing same and generating control signals which are operable to control the operation of said fluid flow control means so as to cause the flow of replenishing fluid from said first reservoir to said second reservoir, said electronic computing means being also operable to control the operation of said second fluid control means to cause the removal of spent fluid from said second reservoir and to cause said spent fluid to flow to said third reservoir so as to allow fluid from said first reservoir to be contained in said second reservoir.

* * * * *